United States Patent [19]

Dudek

[11] 4,084,654
[45] Apr. 18, 1978

[54] PARTIALLY FLUID LACKED VEHICLE DRIVE TRAIN

[75] Inventor: Harold M. Dudek, Bellevue, Wash.

[73] Assignee: Astro Development Corporation, Seattle, Wash.

[21] Appl. No.: 728,307

[22] Filed: Sep. 30, 1976

[51] Int. Cl.² .................................................. B60K 17/16
[52] U.S. Cl. ........................................ 180/44 R; 74/711
[58] Field of Search ...................... 180/44 R, 24.09; 74/711, 710.5

[56] References Cited

U.S. PATENT DOCUMENTS

| | | | |
|---|---|---|---|
| 1,229,548 | 6/1917 | Sant et al. | 74/711 |
| 2,178,613 | 11/1939 | Seeck | 74/711 X |
| 2,574,986 | 11/1951 | Schou | 180/44 R |
| 3,034,322 | 5/1962 | Miller | 74/711 X |
| 3,232,139 | 2/1966 | Nickell | 74/711 |
| 3,343,429 | 9/1967 | Frost | 74/711 |
| 3,869,940 | 3/1975 | Webb et al. | 74/711 |
| 3,923,113 | 12/1975 | Pagdin | 74/711 X |

*Primary Examiner*—Kenneth H. Betts
*Attorney, Agent, or Firm*—Seed, Berry, Vernon & Baynham

[57] ABSTRACT

A drive train is provided with a planetary gear system including sun, planet, and internal ring gears, side plates abut the gears with the side plates being provided with oil passages aligned with teeth of the gears. The oil passages are spaced around the periphery of the gears out of alignment with a meshing point between gears. The gears are housed in an inner housing which is substantially completely filled with oil delivered from a reservoir by gravity flow. The gears advantageously lie in a single plane for ease of sealing and manufacture. Oil passing between the gears serves to cool the gears and is squeezed between meshing teeth to provide a hydraulic resistance and thus partially lock the gears.

10 Claims, 5 Drawing Figures

PARTIALLY FLUID LACKED VEHICLE DRIVE TRAIN

BACKGROUND OF THE INVENTION

1. Field of the Invention

This invention pertains to fluid locked drive trains such as partial slip automotive differentials and the like.

2. Description of the Prior Art

Heretofore, partially fluid locked drive trains have been expensive to manufacture and inefficient in operation. As a result, these partially fluid locked drive trains have not found the widest commercial use as their potential would expect.

SUMMARY OF THE INVENTION

It is an object of this invention to provide a less-expensive-to-manufacture partially fluid locked drive train such as an automotive axle differential or transfer case differential.

It is another object of this invention to provide a partially fluid locked drive train which is efficient to operate and does not generate excessive heat.

It is still another object of this invention to provide an improved partially fluid locked drive train.

Basically, these objects are obtained by constructing a drive train with a planetary gear drive comprising a sun gear, planet gears, and an internal ring gear all of which lie in a common plane and which are enclosed on opposites sides by abutting side plates. The side plates are provided with fluid passages which allow fluid to enter into gear teeth at a point just upstream from a meshing point between the gear teeth of two meshing gears. Some of the holes are aligned with each other in the side plates to allow some of the fluid to pass through the teeth and back out the opposite side plate to cool the teeth. The rest of the oil is carried by the teeth and upon meshing is squeezed between close tolerances of the meshing teeth to form a fluid resistance to meshing which provides the partial fluid lock to the drive train. In the preferred embodiment the side plates and gears are enclosed in an inner housing which is completely filled with fluid to bring substantially all of the gear train into the resistance operation. This internal housing is kept filled from a reservoir by gravity flow which reservoir is filled from splashing the fluid from a sump of an outer housing.

As is readily apparent, the provision of placing all gears in one plane allows for less expensive manufacture and more effective sealing of the internal housing. In one embodiment sealing occurs with flat face seals adjacent the periphery of the sideplates whereas in another embodiment O-ring seals are employed.

Another unique feature of the invention is the use of a partially fluid locked differential transfer case with 4-wheel drive differential axles and to provide the capability of varying the torque from the engine to the different axles.

DETAILED DESCRIPTION OF THE PREFERRED EMBODIMENTS

Figure 1:
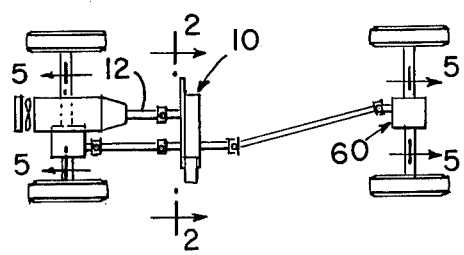
FIG. 1 is a schematic plan of a typical automotive vehicle having various drive trains embodying the principles of the invention.
Figure 2:
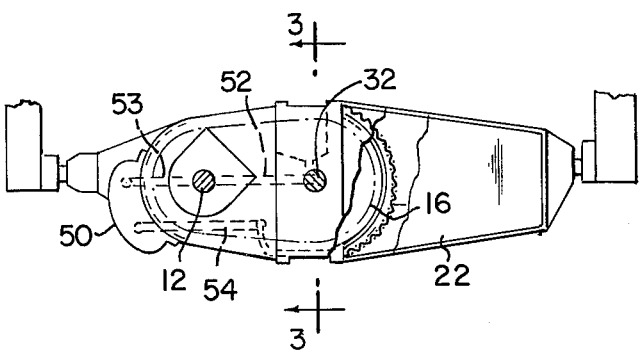
FIG. 2 is a fragmentary section taken along the line 2—2 of FIG. 1 illustrating a transfer case embodiment of the invention.
Figure 3:
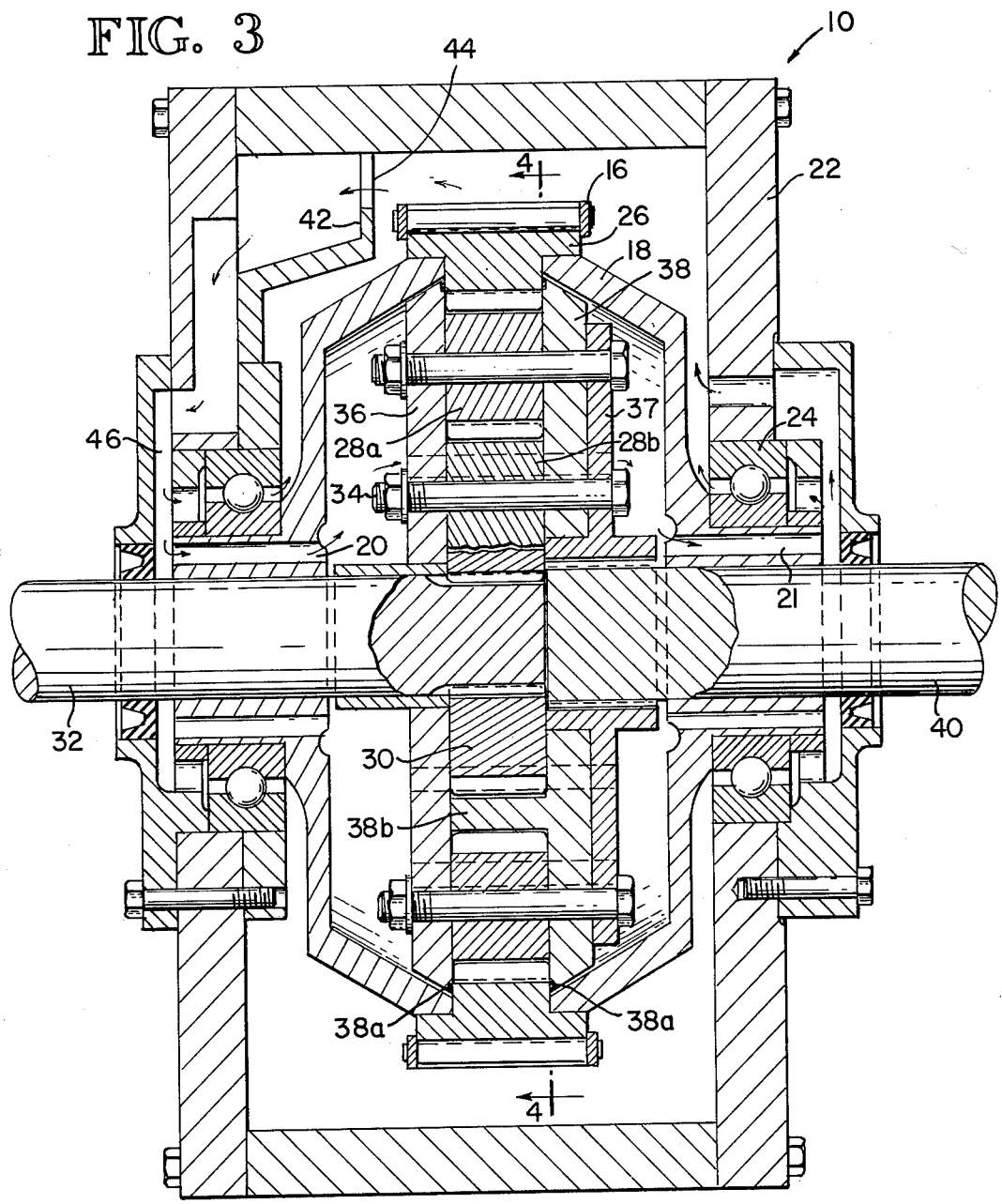
FIG. 3 is a section taken along the line 3—3.
Figure 4:
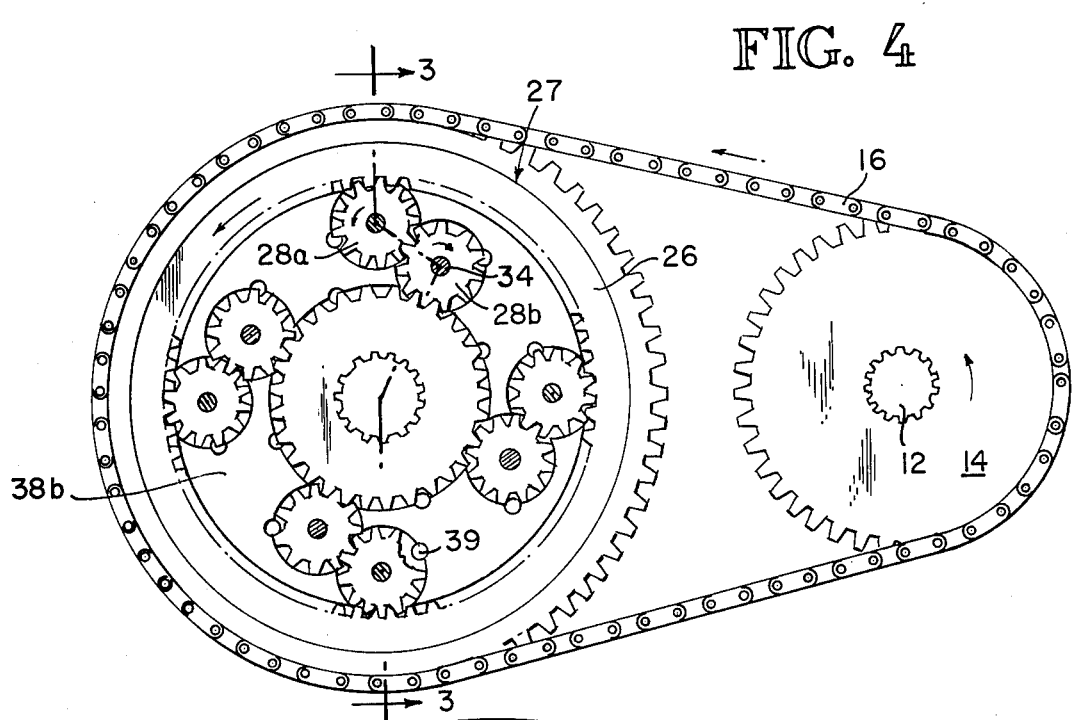
FIG. 4 is a section taken along the line 4—4 of FIG. 3.

As best shown in FIG. 1 the partially fluid locked drive train of this invention can be used either as a transfer case differential or an axle differential or any other device in which it is desirable for transmitting torque to two or more output shafts and to automatically transfer torque to a selected shaft when the other shaft loses traction and provides no driving force. As best shown in FIGS. 2, 3 and 4 a differential transfer unit 10 is illustrated. The transfer unit includes a drive shaft 12 coupled to the engine of the vehicle. The drive shaft is splined to a sprocket 14 over which is entrained a chain 16. The chain 16 transmits power to the differential drive of this invention. This differential drive includes an inner housing 18 having oil inlet passages 20 and outlet passages 21. The inner housing is separated from an outer housing 22 by sets of bearings 24. At its opposite ends the inner housing is fixed to a ring gear 26 which forms a part of a planetary differential 27.

The planetary differential 27 includes the internal ring gear 26 which has teeth that mesh with a plurality of sets of planet gears 28a and 28b which in turn mesh with a sun gear 30. A forward output shaft 32 is splined in the sun gear 30.

The planet gears 28a and 28b rotate on bolts 34 which secure a planet carrier 37 to the planet gears and hold in abutting relation thereto forward and rearward side plates 36 and 38, respectively. Plate 38 is integral with a central housing plate 38b which holds the planet gears and closely surrounds the peripheries of the gears. An output shaft 40 is splined in the planet carrier. Each of the side plates is provided with ports 39 (FIG. 4) some or all of which are coaxially aligned between the two plates. It is not necessary, however, that all of the ports 39 be coaxially aligned. Each of the ports is also aligned with the toothed periphery of one of the gears of the planetary differential. The purpose of the ports is to allow oil or other suitable fluid to be introduced through one side plate into the gap between teeth of the gears so that the gear teeth will carry the oil to the meshing point with its next adjacent gear. At the meshing point the gears act as a pump and squeeze the oil squirting it out in all directions around the teeth of the meshing gears. As a result, the oil provides a resistance against rotation of the gears to provide the hydraulic resistance necessary for a partially locked differential of this type. The side plates fit closely against the gears and surround the peripheries of the gears. The clearance between the gears and the side plates controls the amount of slippage in the drive train. Those passages in the side plates which are also coaxially aligned allow a portion of the oil to continue through the space between the gear teeth and out through the ports in the opposite plate so that the oil can flush the surface of the gear teeth providing cooling. It should also be noted that the ports in the side plates are not aligned at a point of mesh between two adjacent gears but rather are spaced about the periphery of the gears from their point of mesh so that the pumping action does not occur right at the ports but rather spaced from the ports and in a relatively tightly sealed area. Flat peripheral face seals 38a seal the side plates to the gears.

As is readily apparent, all of the gears lie in a common plane thus facilitating manufacture and providing for less expensive gear cost. Secondly, it should be noted that the side plates are well sealed to maintain the fluid lock. Thirdly, the inner housing completely surrounds the gears to maintain them fully submerged. This is a desirable feature since the efficiency of the oil drag on the planetary differential is increased as the number of gear meshes come into play. To facilitate keeping the inner housing substantially full and thus submerging essentially all of the side plate ports, the outer housing is provided with a reservoir 42 having an entrance opening 44 and a gravity discharge path 46. The outer housing is filled to about 40% with oil such that the chain 16 is dragged through the oil bringing oil up to the top of the outer housing 22 and flinging it into the inlet 44 of the reservoir 42. This action is sufficient to maintain to reservoir full and since the reservoir is located above the top of the inner housing 18, there is sufficient static head to cause gravity flow of the oil into the inner housing to maintain the inner housing full. This gravity flow system is much less expensive and just as efficient as using a pump oil source for the differential. The single plane spur gears also allow better sealing tolerances between the side plates and the side surfaces of the gears increasing the amount of resistance caused by the pumped oil.

As best shown in FIG. 2 the outer housing 22 is also provided with an auxiliary sump 50 which is coupled to the main reservoir 42 by a tube 52 and delivers oil also to the shaft 12 for lubrication. A discharge tube 54 passes from the auxiliary sump and delivers oil to the top surface of the bottom run of the chain 16 where the chain carries it back up to the top of the auxiliary sump. A second discharge tube 53 also delivers to the shaft 12 from the auxiliary sump.

Figure 5:
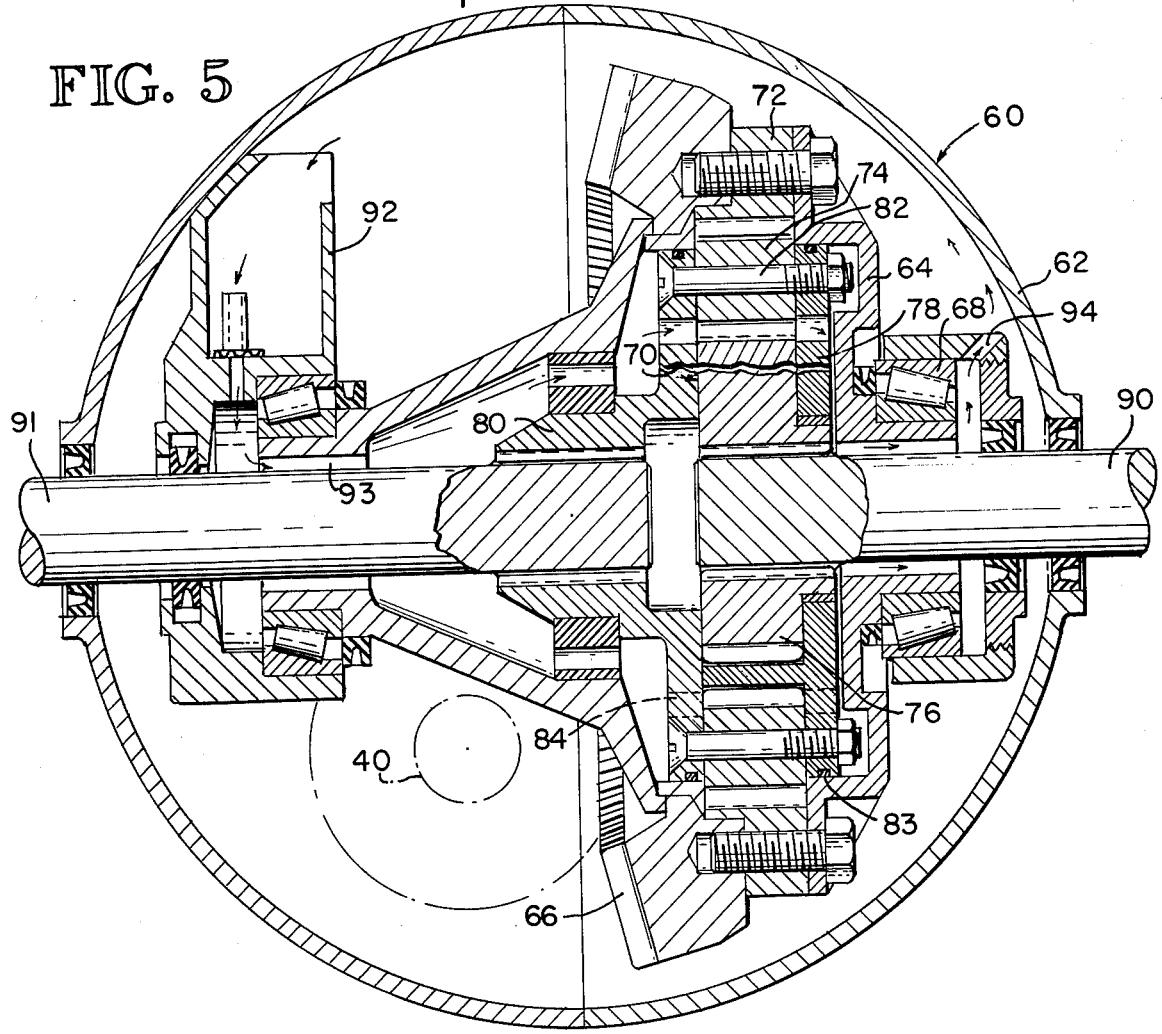
FIG. 5 is a section taken along the line 5—5 of FIG. 1 illustrating a differential embodiment of the invention.

As best shown in FIG. 5 a partially fluid locked axle differential 60 is illustrated and is also provided with an outer housing 62 and an inner housing 64. The inner housing is secured to a hypoid gear 66 which receives power from the rear output shaft 40 through a gear in a conventional manner. The inner housing is suitably mounted on bearings 68. A planetary differential 70 is within the inner housing and is provided with a ring gear 72, a plurality of planet gears 74 and a sun gear 76. Left-hand and right-hand side plates 78 and 80, respectively, are secured tightly by bolts 82 which hold the side plates in close abutting relation to the sun and planet gears with the side plates forming planet carriers for the planet gears 74. Each side plate is also provided with oil ports 84 as in the embodiment of FIG. 3. The sun gear 76 is splined to the left axle 90 whereas the right axle 91 is splined to the right side plate 80. O-ring seals 83 seal the side plates.

The axle differential unit operates in essentially the same manner as the transfer case differential with oil being flung by the hypoid gear 66 into a reservoir 92 where it reaches a level above the top of the inner housing and then flows by gravity through a passage 93 into the inner housing and to the oil ports 84. Discharge of the oil from the inner housing is through a passage 94.

As is best shown in FIG. 1, the partially fluid locked differential transfer case is uniquely coupled to two differential axles (preferably partially fluid locked differential axles) to provide partial slip power not only to each wheel but also between front and rear sets of wheels. One advantageous use of this unique feature is the provision of a desired gear ratio between the sun and internal gears of the transfer case to provide different output torques to the front and rear axle differentials. For example in a hill climbing four-wheel drive vehicle the greater weight is on the rear axle, and thus the rear axle can use more torque than the front axle. Thus a gear ratio in the transfer case to provide about 57% of the torque on the rear axle is provided. Similar benefits can be obtained for vehicles which require rapid acceleration causing the weight to shift rearward.

While the preferred embodiments of the invention have been illustrated and described it should be understood that variations will be apparent to one skilled in the art without departing from the principles herein. Accordingly, the invention is not to be limited to the specific structure illustrated in the drawings.

The embodiments of the invention in which a particular property or privilege is claimed are defined as follows:

1. A partially fluid locked gear drive train for a transfer case or differential or the like comprising:
    an outer fluid tight housing,
    an inner housing,
    a planetary gear train within said inner housing, said gear train including a sun gear, a plurality of planet gears and an internal ring gear, all said gears lying in a common plane,
    plate means positioned on opposite sides of said gears in close abutting relation thereto and closely surrounding the peripheries of the gears, said plate means including coaxially aligned fluid inlet and outlet ports, the location of said ports being also aligned with teeth of said gears but spaced around the periphery of the gears a distance from a from a point of mesh between two meshing gears whereby fluid is carried by the gear to a point of mesh for partial fluid lock and is also passed through the gear teeth for cooling, and
    means for delivering fluid into said inner housing and maintaining the inner housing in a generally filled condition.

2. The drive train of claim 1, wherein said internal ring gear includes an external sprocket, and including chain means coupling the sprocket to an output sprocket for transferring power.

3. The drive train of claim 1, including a first axle shaft coupled to said sun gear, said plate means being coupled to said planet gears for forming a planet carrier, a second axle shaft coupled to the planet carrier through one of said plate means for providing a differential drive to said axle shafts, and an input gear coupled to said ring gear for providing power to the differential drive train.

4. The drive train of claim 1, said outer housing being partially filled with fluid to form a sump, said fluid delivery means including means on said ring gear for raising fluid from said sump.

5. The drive train of claim 1, said side plate means having flat face seals encircling the plate means and abutting gears adjacent the periphery of the plate means.

6. The drive train of claim 1, said side plate means having circumferential O-ring seals around the periphery of the side plate means for sealing fluid between the gears and side plate means.

7. The drive train of claim 1, said inner housing having inlet openings, said means for delivering fluid into said inner housing and maintaining the inner housing in a generally filled condition including a reservoir located above said housing inlet openings for gravity feeding said inlet openings.

8. A drive train for a four-wheel drive vehicle comprising:
forward axles each coupled to a wheel and a common forward axle differential,
rearward axles each coupled to a wheel and a common rearward axle differential,
an engine, and
a partially fluid locked differential transfer case coupled between the engine and the common forward and rearward axle differentials for distributing power therebetween, said transfer case including an outer fluid tight housing, an inner housing, a planetary gear train within said inner housing, said gear train including a sun gear, a plurality of planet gears and an internal ring gear, all said gears lying in a common plane, plate means positioned on opposite sides of said gears in close abutting relation thereto and closely surrounding the peripheries of the gears, said plate means including coaxially aligned fluid inlet and outlet ports, the location of said ports being also aligned with teeth of said geaars but spaced around the periphery of the gears a distance from a point of mesh between two meshing gears whereby fluid is carried by the gear to a point of mesh for partial fluid lock and is also passed through the gear teeth for cooling, and means for delivering fluid into said inner housing and maintaining the inner housing in a generally filled condition.

9. The drive train of claim 8, wherein each of said axle differentials is a partially fluid locked differential, said differentials each including an outer fluid tight housing, an inner housing, a planetary gear train within said inner housing, said gear train including a sun gear, a plurality of planet gears and an internal ring gear, all said gears lying in a common plane, plate means positioned on opposite sides of said gears in close abutting relation thereto and closely surrounding the peripheries of the gears, said plate means including coaxially aligned fluid inlet and outlet ports, the location of said ports being also aligned with teeth of said gears but spaced around the periphery of the gears a distance from a point of mesh between two meshing gears whereby fluid is carried by the gear to a point of mesh for partial fluid lock and is also passed through the gear teeth for cooling, and means for delivering fluid into said inner housing and maintaining the inner housing in a generally filled condition.

10. The drive train of claim 8, wherein the transfer case includes gear means for providing different output torques to the forward and rearward axles whereby a greater torque can be provided to the axles having the greater usable torque capacity.

* * * * *